(12) United States Patent
Hsieh

(10) Patent No.: US 10,571,659 B2
(45) Date of Patent: Feb. 25, 2020

(54) WIDE ANGLE IMAGING LENS ASSEMBLY

(71) Applicant: SENYUN PRECISION OPTICAL CORPORATION, Taoyuan (TW)

(72) Inventor: Tien-Liang Hsieh, Taoyuan (TW)

(73) Assignee: SENYUN PRECISION OPTICAL CORPORATION, Taoyuan (TW)

( * ) Notice: Subject to any disclaimer, the term of this patent is extended or adjusted under 35 U.S.C. 154(b) by 0 days.

(21) Appl. No.: 15/627,392

(22) Filed: Jun. 19, 2017

(65) Prior Publication Data
US 2018/0314038 A1 Nov. 1, 2018

(30) Foreign Application Priority Data

Apr. 28, 2017 (TW) .............................. 106114165 A

(51) Int. Cl.
| G02B 13/00 | (2006.01) |
| G02B 9/60 | (2006.01) |
| G02B 13/18 | (2006.01) |
| G02B 5/20 | (2006.01) |

(52) U.S. Cl.
CPC .......... *G02B 13/0045* (2013.01); *G02B 9/60* (2013.01); *G02B 13/18* (2013.01); *G02B 5/208* (2013.01)

(58) Field of Classification Search
CPC ...... G02B 9/60; G02B 13/0045; G02B 13/18; G02B 3/04
USPC .................. 359/682, 714, 746, 753, 763–770
See application file for complete search history.

(56) References Cited

U.S. PATENT DOCUMENTS

| 7,663,813 | B2* | 2/2010 | Lai | G02B 9/58 |
| | | | | 359/708 |
| 8,477,432 | B2* | 7/2013 | Huang | G02B 13/0045 |
| | | | | 359/714 |
| 8,649,113 | B1* | 2/2014 | Tsai | G02B 13/0045 |
| | | | | 359/714 |
| 2012/0162769 | A1* | 6/2012 | Suzuki | G02B 13/0045 |
| | | | | 359/558 |
| 2014/0211328 | A1* | 7/2014 | Hashimoto | G02B 13/0045 |
| | | | | 359/714 |

(Continued)

FOREIGN PATENT DOCUMENTS

| CN | 103777317 | 5/2014 |
| JP | 2014160141 | 9/2014 |
| TW | 201708865 | 3/2017 |

OTHER PUBLICATIONS

"Office Action of Taiwan Counterpart Application," dated Jan. 18, 2018, p. 1-p. 5.

*Primary Examiner* — Nicholas R. Pasko
(74) *Attorney, Agent, or Firm* — JCIPRNET

(57) ABSTRACT

A wide angle imaging lens assembly includes a first lens element, an aperture, a second lens element, a third lens element, a fourth lens element, and a fifth lens element from an object side to an image side in order along an optical axis. The first lens element to the fifth lens element each includes an object-side surface facing the object side and an image-side surface facing the image side. The wide angle imaging lens assembly satisfies 1.25≤f/f2≤2.1 and (R5+R6)/(R5−R6) >0.25, where f is the effective focal length of the wide angle imaging lens assembly, f2 is the focal length of the second lens element, R5 is the radius of curvature of the object-side surface of the third lens element, and R6 is the radius of curvature of the image-side surface of the third lens element.

5 Claims, 4 Drawing Sheets

(56) References Cited

U.S. PATENT DOCUMENTS

2015/0219879 A1* 8/2015 Zhao .................. G02B 13/0045
348/335
2017/0168264 A1* 6/2017 Chen ........................ G02B 9/60
2017/0176720 A1* 6/2017 Zhao ........................ G02B 9/60

* cited by examiner

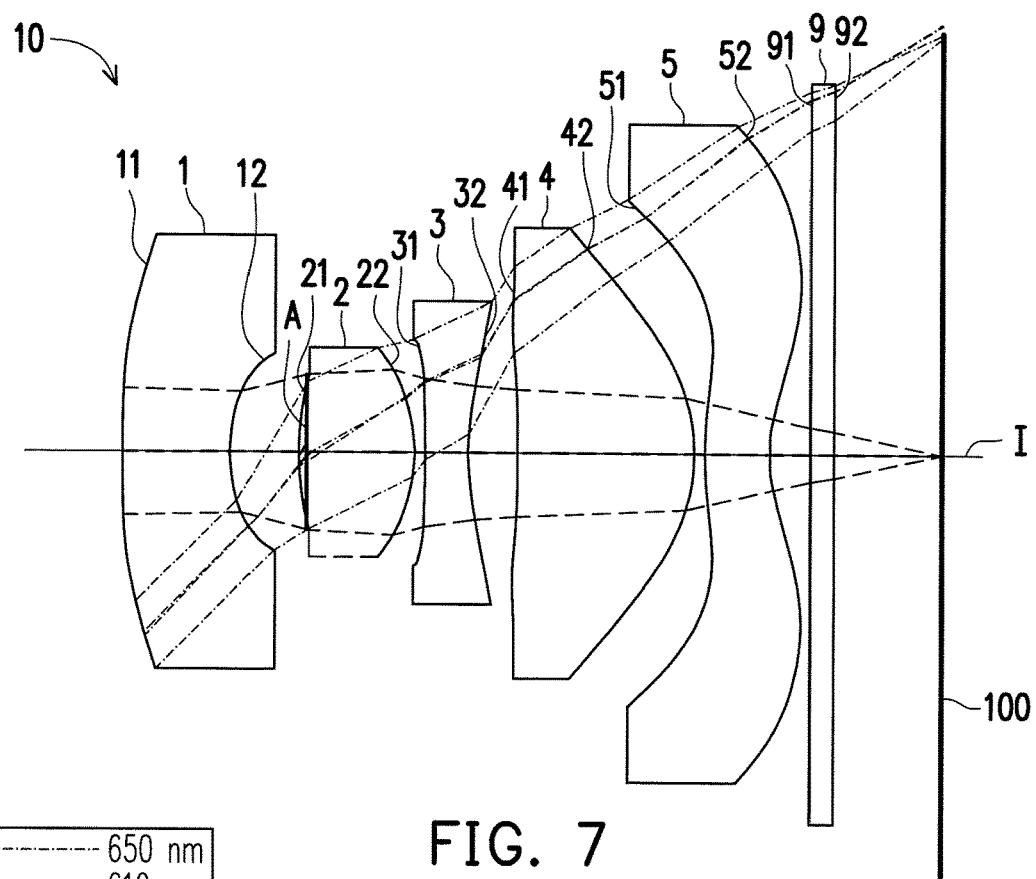
FIG. 7
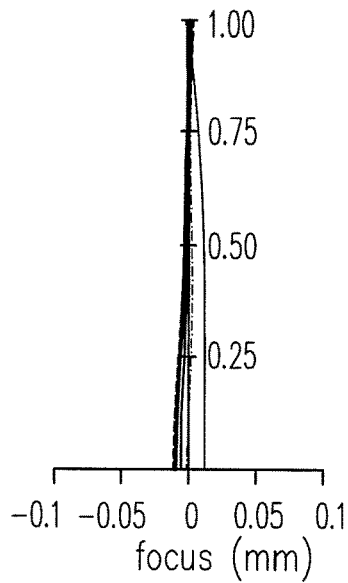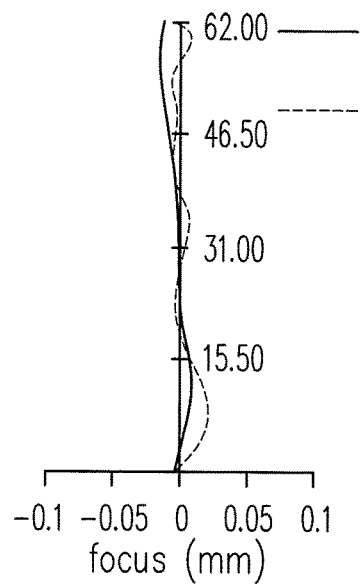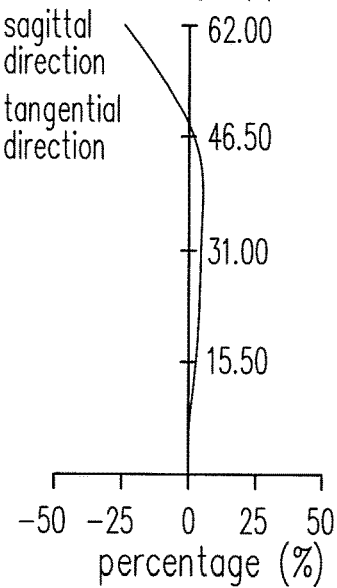
FIG. 8A  FIG. 8B  FIG. 8C

WIDE ANGLE IMAGING LENS ASSEMBLY

CROSS-REFERENCE TO RELATED APPLICATION

This application claims the priority benefit of Taiwan application serial no. 106114165, filed on Apr. 28, 2017. The entirety of the above-mentioned patent application is hereby incorporated by reference herein and made a part of this specification.

BACKGROUND OF THE INVENTION

Field of the Invention

The invention relates to an optical lens assembly and particularly relates to a wide angle imaging lens assembly.

Description of Related Art

In recent years, the prevalence of mobile electronic devices boosts the vigorous development of technologies related to the image modules. An image module mainly includes an optical lens assembly, an optical sensor, and other elements. Along with the trend of slimness of the mobile electronic devices, the need for miniaturizing the optical lens assembly, the optical sensor, and other elements increases. However, to avoid the decrease in the quality of and effects on obtained images, the optical performance has to be retained as the system volume and length are being reduced. The current optical lens assembly capable of performing a wide-angle function has a disadvantage of large volume and length. As a result, reduction of the system volume and length of the optical lens assembly with the wide-angle function without sacrificing the favorable optical performance of said optical lens assembly has become one of the problems to be solved by research and development personnel in the pertinent field.

SUMMARY OF THE INVENTION

The invention provides a wide angle imaging lens assembly capable of retaining favorable optical performance while the system volume and length are reduced.

The wide angle imaging lens assembly of the invention includes a first lens element, an aperture, a second lens element, a third lens element, a fourth lens element, and a fifth lens element from an object side to an image side in order along an optical axis. The first lens element to the fifth lens element each includes an object-side surface facing the object side and allowing an imaging light to pass through and an image-side surface facing the image side and allowing the imaging light to pass through. The wide angle imaging lens assembly satisfies $1.25 \leq f/f2 \leq 2.1$ and $(R5+R6)/(R5-R6) > 0.25$, wherein f is an effective focal length of the wide angle imaging lens assembly, f2 is a focal length of the second lens element, R5 is a radius of curvature of the object-side surface of the third lens element, and R6 is a radius of curvature of the image-side surface of the third lens element.

In an embodiment of the invention, the first lens element has a negative refractive power, the second lens element has a positive refractive power, the third lens element has a negative refractive power, the fourth lens element has a positive refractive power, and the fifth lens element has a negative refractive power.

In an embodiment of the invention, the image-side surface of the first lens element is concave, the object-side surface of the second lens element is convex, the image-side surface of the second lens element is convex, the image-side surface of the third lens element is concave, the image-side surface of the fourth lens element is convex, the object-side surface of the fifth lens element is convex, the image-side surface of the fifth lens element is concave, and the object-side surface and image-side surface of the fifth lens element both have an inflection point.

In an embodiment of the invention, the wide angle imaging lens assembly further satisfies: $0.6 \leq |f/f1| \leq 1.0$, wherein f1 is a focal length of the first lens element.

In an embodiment of the invention, the wide angle imaging lens assembly further satisfies: $1.2 \leq \tan(HFOV) \leq 2.15$, wherein HFOV is a half field of view of the wide angle imaging lens assembly.

In an embodiment of the invention, the wide angle imaging lens assembly further satisfies: $1.6 \leq TTL/ImgH \leq 2.5$, wherein TTL is a distance on the optical axis from the first lens element to an imaging plane, and ImgH is an imaging height.

In an embodiment of the invention, the wide angle imaging lens assembly further satisfies: $0.6 \leq f3/f4 \leq 2.0$, wherein f3 is a focal length of the third lens element, and f4 is a focal length of the fourth lens element.

In an embodiment of the invention, the wide angle imaging lens assembly further satisfies: $|V1-V2| < 10$, wherein V1 is a coefficient of dispersion of the first lens element, and V2 is a coefficient of dispersion of the second lens element.

Based on the above, the wide angle imaging lens assembly according to the embodiments of the invention has following beneficial effects. With the concave and convex designs and arrangements of the object-side surface and the image-side surface of the lens elements, the wide angle imaging lens assembly retains the favorable optical performance and provides satisfactory imaging quality with the reduced system volume and length.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 7 is a schematic view of a wide angle imaging lens assembly according to a fourth embodiment of the invention.

FIG. 8A to FIG. 8C are diagrams of a longitudinal spherical aberration, of an astigmatism aberration, and of a distortion aberration according to the fourth embodiment of the invention, respectively.

DESCRIPTION OF THE EMBODIMENTS

In the disclosure of this specification, "a lens element having a positive refractive power (or a negative refractive power)" means that a refractive power of the lens element on an optical axis, calculated by applying the theory of Gaussian optics, is positive (or is negative). In a wide angle imaging lens assembly, the lens elements are radially symmetrical with each other with the optical axis as an axis of symmetry. Each lens element has an object-side surface and an image-side surface opposite to the object-side surface. The object-side surface and the image-side surface are defined as a range which an imaging light passes through, wherein the imaging light includes a chief ray and a marginal ray. The object-side surface (or the image-side surface) has an area near the optical axis and a marginal area connected to and surrounding the area near the optical axis. The area near the optical axis is an area which the imaging light passes through on the optical axis. The marginal area is an area passed through by the marginal ray.

In the disclosure of this specification, "a surface (the object-side surface or the image-side surface) of the lens element is convex or concave" is determined by whether an R-value (referring to a paraxial radius of curvature) of the surface in the area near the optical axis is positive or negative. As for the object-side surface, if the R-value is positive, the object-side surface is determined to be convex, i.e., the object-side surface has a convex portion in the area near the optical axis; if the R-value is negative, the object-side surface is determined to be concave, i.e., the object-side surface has a concave portion in the area near the optical axis. As for the image-side surface, if the R-value is positive, the image-side surface is determined to be concave, i.e., the image-side surface has a concave portion in the area near the optical axis; if the R-value is negative, the image-side surface is determined to be convex, i.e., the image-side surface has a convex portion in the area near the optical axis.

A surface (the object-side surface or the image-side surface) of the lens element can have at least one convex portion, at least one concave portion, or a combination thereof. If the surface has a convex portion and a concave portion, the surface has an inflection point. The inflection point is a conversion point between the convex portion and the concave portion. In other words, the surface is converted from convex to concave or from concave to convex at the inflection point. On the other hand, if the surface has only the convex portion or only the concave portion, the surface does not have any inflection point.

Figure 1:
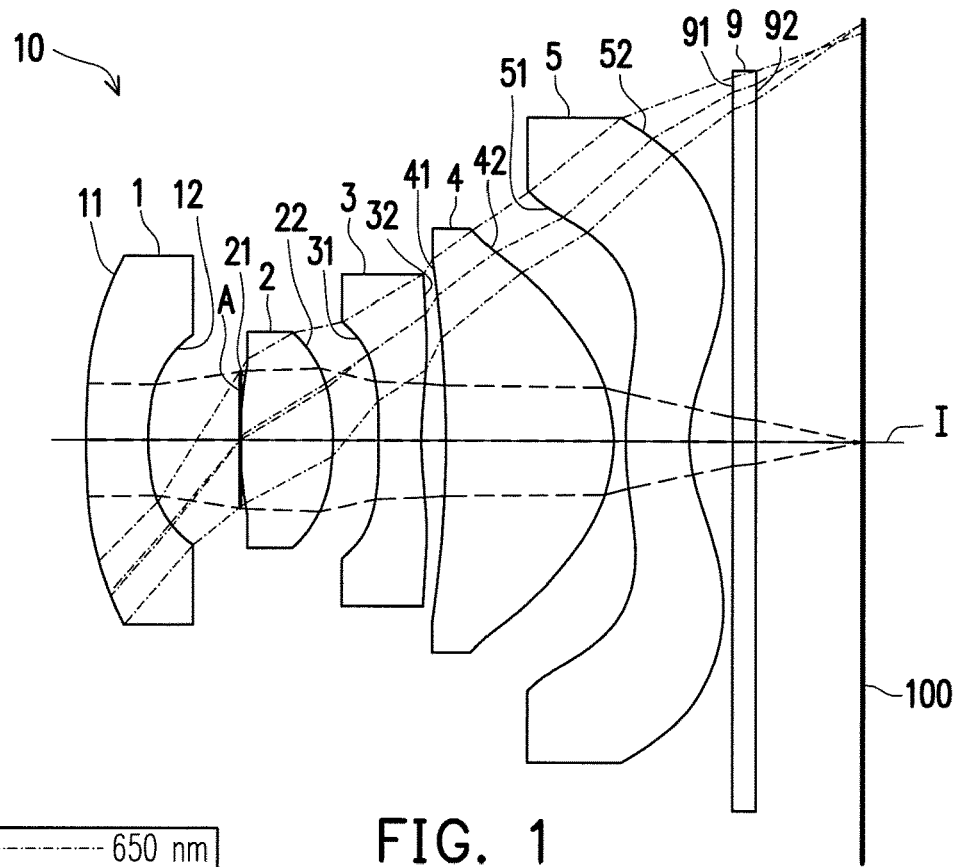
FIG. 1 is a schematic view of a wide angle imaging lens assembly according to a first embodiment of the invention.

FIG. 1 is a schematic view of a wide angle imaging lens assembly according to a first embodiment of the invention. As shown in FIG. 1, a wide angle imaging lens assembly 10 provided in the first embodiment of the invention includes a first lens element 1, an aperture A, a second lens element 2, a third lens element 3, a fourth lens element 4, a fifth lens element 5, and an optical filter 9 from an object side to an image side in order along an optical axis I. The object side is a side facing an object to be photographed, and the image side is a side facing an image plane 100. After a light emitted from the object to be photographed enters the wide angle imaging lens assembly 10, the light emitted from the object to be photographed passes through the first lens element 1, the aperture A, the second lens element 2, the third lens element 3, the fourth lens element 4, the fifth lens element 5, and the optical filter 9 in order and then forms an image on the image plane 100. The optical filter 9 includes but is not limited to, for example, an infrared (IR) cut filter adapted to prevent some infrared ray at certain wavebands of the light from being transmitted to the image plane 100 and affecting an imaging quality.

The first lens element 1, the second lens element 2, the third lens element 3, the fourth lens element 4, and the fifth lens element 5 respectively include an object-side surface 11, an object-side surface 21, an object-side surface 31, an object-side surface 41, and an object-side surface 51 facing the object side and allowing an imaging light to pass through; the first lens element 1, the second lens element 2, the third lens element 3, the fourth lens element 4, and the fifth lens element 5 respectively include an image-side surface 12, an image-side surface 22, an image-side surface 32, an image-side surface 42, and an image-side surface 52 facing the image side and allowing the imaging light to pass through.

To satisfy the need for light weight, the first lens element 1 to the fifth lens element 5 can all be produced by a plastic material; however, the invention is not limited thereto.

The first lens element 1 has a negative refractive power. The object-side surface 11 of the first lens element 1 is convex, and the image-side surface 12 of the first lens element 1 is concave. The second lens element 2 has a positive refractive power. The object-side surface 21 of the second lens element 2 is convex, and the image-side surface 22 of the second lens element 2 is convex. The third lens element 3 has a negative refractive power. The object-side surface 31 of the third lens element 3 is concave, and the image-side surface 32 of the third lens element 3 is concave. The fourth lens element 4 has a positive refractive power. The object-side surface 41 of the fourth lens element 4 is concave, and the image-side surface 42 of the fourth lens element 4 is convex. The fifth lens element 5 has a negative refractive power. The object-side surface 51 of the fifth lens element 5 is convex, and the image-side surface 52 of the fifth lens element 5 is concave. In addition, the object-side surface 51 of the fifth lens element 5 and the image-side surface 52 of the fifth lens element 5 both have an inflection point.

The first lens element 1 is adapted to provide a function of collecting light, and the negative refractive power of the first lens element 1 can collect a large-angle imaging light into the aperture A. The second lens element 2 is adapted to focus the imaging light having passed through the aperture A and form an image, and the second lens element 2 along with the third lens element 3 and the fourth lens element 4 is adapted to correct a chromatic aberration. The inflection points of the fifth lens element 5 are designed to reduce a system length and to correct an angle of incidence at which the imaging light enters the image plane 100.

In the first embodiment of the invention, only the aforementioned lens elements have a refractive power; in other words, only five lens elements in the wide angle imaging lens assembly 10 have a refractive power.

Other detailed optical data provided in the first embodiment of the invention are shown in Table 1. According to Table 1, a distance (mm) of 0.288 corresponding to the object-side surface 11 of the first lens element 1 means that a distance from the object-side surface 11 of the first lens element 1 to the image-side surface 12 of the first lens element 1 on the optical axis I (i.e., a thickness of the first lens element 1 on the optical axis I) is 0.288 mm. Similarly, a distance (mm) of 0.425 corresponding to the image-side surface 12 of the first lens element 1 means that a distance from the image-side surface 12 of the first lens element 1 to the aperture A on the optical axis I is 0.425 mm. Similarly, a distance (mm) of 0.001 corresponding to the aperture A means that a distance from the aperture A to the object-side surface 21 of the second lens element 2 on the optical axis I is 0.001 mm. If the distance (mm) corresponding to the aperture A is negative, it indicates that the object-side surface 21 of the second lens element 2, compared to the aperture A, is closer to the object side. The distance in other columns can be deduced from the above in the same manner, and thus relevant description will not be provided hereinafter.

In Formula (1), Y is a distance from a point on an aspherical curve to the optical axis I; Z is a depth of the aspherical surface; R is a radius of curvature of a surface of the lens element that is close to the optical axis I; K is a conic constant; $A_i$ is an $i^{th}$-order aspheric coefficient.

Each aspheric coefficient of the 10 surfaces from the object-side surface 11 of the first lens element 1 to the image-side surface 52 of the fifth lens element 5 is shown in Table 2. According to Table 2, column no. 11 provides an aspheric coefficient of the object-side surface 11 of the first lens element 1, and the data provided in other columns can be deduced from the above in the same manner. The $2^{nd}$-order and $16^{th}$-order aspheric coefficients $A_2$ and $A_{16}$ of the 10 surfaces are all 0, and thus relevant descriptions are omitted.

TABLE 1

First embodiment

| surface | | radius of curvature (mm) | distance (mm) | index of refraction | coefficient of dispersion | focal length (mm) |
|---|---|---|---|---|---|---|
| object | | infinity | infinity | | | |
| first lens element 1 | object-side surface 11 | 4.874 | 0.288 | 1.545 | 55.9 | −2.11 |
| | image-side surface 12 | 0.912 | 0.425 | | | |
| aperture A | | infinity | 0.001 | | | |
| second lens element 2 | object-side surface 21 | 1.531 | 0.436 | 1.545 | 55.9 | 1.03 |
| | image-side surface 22 | −0.803 | 0.207 | | | |
| third lens element 3 | object-side surface 31 | −5.102 | 0.200 | 1.643 | 22.4 | −1.96 |
| | image-side surface 32 | 1.716 | 0.110 | | | |
| fourth lens element 4 | object-side surface 41 | −2.910 | 0.781 | 1.545 | 55.9 | 1.19 |
| | image-side surface 42 | −0.582 | 0.050 | | | |
| fifth lens element 5 | object-side surface 51 | 1.105 | 0.300 | 1.643 | 22.4 | −2.44 |
| | image-side surface 52 | 0.581 | 0.202 | | | |
| optical filter 9 | object-side surface 91 | infinity | 0.110 | 1.516 | 64.1 | |
| | image-side surface 92 | infinity | 0.490 | | | |
| | image plane 100 | infinity | | | | |

In this embodiment, the object-side surface 11 and image-side surface 12 of the first lens element 1, the object-side surface 21 and image-side surface 22 of the second lens element 2, the object-side surface 31 and image-side surface 32 of the third lens element 3, the object-side surface 41 and image-side surface 42 of the fourth lens element 4, and the object-side surface 51 and image-side surface 52 of the fifth lens element 5 (10 surfaces in total) are all aspherical surfaces, and the aspherical surfaces are defined by Formula (1) as follows:

$$Z(Y) = \frac{Y^2}{R} \bigg/ \left(1 + \sqrt{1 - (1+K)\frac{Y^2}{R^2}}\right) + \sum_{i=1}^{n} A_i \times Y^i \quad (1)$$

TABLE 2

| surface | K | $A_4$ | $A_6$ | $A_8$ |
|---|---|---|---|---|
| 11 | −1.504E+01 | 6.466E−01 | −9.661E−01 | 1.452E+00 |
| 12 | 2.550E+00 | 8.489E−01 | 2.871E+00 | −4.070E+01 |
| 21 | −1.295E+01 | 3.768E−01 | −2.080E+00 | 9.297E+00 |
| 22 | 1.533E+00 | −1.114E−01 | 1.046E+00 | −7.153E−01 |
| 31 | 2.863E+01 | −2.239E+00 | 2.905E+00 | −2.337E+01 |
| 32 | −7.458E+00 | −1.071E+00 | 2.082E+00 | −3.348E+00 |
| 41 | −1.096E+01 | 5.874E−01 | −2.057E+00 | 3.344E+00 |
| 42 | −7.327E−01 | 4.748E−01 | −1.030E+00 | 2.716E+00 |
| 51 | −1.482E+01 | 7.485E−02 | −3.929E+00 | 1.103E+01 |
| 52 | −1.981E+00 | −1.398E+00 | 2.087E+00 | −1.922E+00 |

| surface | $A_{10}$ | $A_{12}$ | $A_{14}$ |
|---|---|---|---|
| 11 | −1.739E+00 | 8.756E−01 | −1.746E−01 |
| 12 | 2.858E+02 | −9.464E+02 | 1.234E+03 |

TABLE 2-continued

| 21 | −3.420E+02 | 2.913E+03  | −1.060E+04 |
| 22 | 5.167E+00  | −4.794E+01 | 7.288E+01  |
| 31 | 1.557E+02  | −6.511E+02 | 1.011E+03  |
| 32 | 5.869E+00  | −7.861E+00 | 5.916E+00  |
| 41 | −2.797E+00 | 1.192E+00  | −2.046E−01 |
| 42 | −3.943E+00 | 2.420E+00  | −1.208E−01 |
| 51 | −1.533E+01 | 1.006E+01  | −2.450E+00 |
| 52 | 1.015E+00  | −2.937E−01 | 3.642E−02  |

In consideration of the unpredictability of the optical system design, in the invention, as long as at least one of the conditional formulas provided below is satisfied, the system length can be shortened, the imaging quality can be improved, or the manufacturing yield can be increased, and thereby the conventional defects can be rectified.

The chromatic aberration can be effectively corrected by satisfying $1.25 \leq f/f2 \leq 2.1$, wherein f is an effective focal length of the wide angle imaging lens assembly 10, and f2 is a focal length of the second lens element 2. When f/f2 exceeds an upper limit or a lower limit according to the conditional formula, the difference between the refractive power of the second lens element 2 and the refractive power of the fourth lens element 4 increases, which causes the aberration to be concentrated to one of the lens elements, and thereby the tolerance of the optical system becomes sensitive. In addition, when f/f2 is close to the lower limit, the refractive power of the fourth lens element 4 increases, which worsens the off-axis aberration.

The shape of the third lens element 3 can be controlled by satisfying $(R5+R6)/(R5-R6) > 0.25$, such that the third lens element 3 may be bent toward the image side. Here, R5 is a radius of curvature of the object-side surface 31 of the third lens element 3, and R6 is a radius of curvature of the image-side surface 32 of the third lens element 3.

A light collecting angle can be controlled while the system length is being controlled by satisfying $0.6 \leq |f/f1| \leq 1.0$, wherein f1 is the focal length of the first lens element 1. If |f/f1| exceeds the upper limit according to the conditional formula, the first lens element 1 has a great negative refractive power, and the large-angle imaging light is transformed to a light entering the aperture A at a smaller angle; however, the system length (TTL) increases. When |f/f1| exceeds the lower limit according to the conditional formula, the system length (TTL) may decrease, but the light collecting angle of the second lens element 2 then becomes so large that the optical system becomes sensitive.

In addition, the wide angle imaging lens assembly 10 satisfies $1.2 \leq \tan(\text{HFOV}) \leq 2.15$, wherein HFOV is a half field of view of the wide angle imaging lens assembly 10. Specifically, a field of view (i.e., twice the half field of view) of the wide angle imaging lens assembly 10 falls within a range from 100 degrees to 130 degrees. As compared to the existing wide angle imaging lens assembly (with the field of view approximately falling within a range from 70 degrees to 80 degrees), the wide angle imaging lens assembly 10 provided in this embodiment can have a larger light collecting angle.

The manufacturing yield and the system length and volume can be balanced by satisfying $1.6 \leq \text{TTL/ImgH} \leq 2.5$. TTL is a distance on the optical axis I from the first lens element 1 to the imaging plane 100 (i.e., the system length). ImgH is an imaging height. When TTL/ImgH exceeds an upper limit according to the conditional formula, the system length (TTL) is overly long, which results in the excessive system volume. When TTL/ImgH exceeds a lower limit according to the conditional formula, the TTL is overly short, and the tolerance of the optical system becomes sensitive, resulting in a low manufacturing yield.

A chromatic aberration can be corrected effectively by satisfying at least one of $0.6 \leq |f3/f4| \leq 2.0$ and $|V1-V2| < 10$, wherein f3 is a focal length of the third lens element 3, f4 is a focal length of the fourth lens element 4, V1 is a coefficient of dispersion of the first lens element 1, and V2 is a coefficient of dispersion of the second lens element 2. The coefficient of dispersion is also known as an Abbe number.

In the first embodiment, a relation among the important parameters of the wide angle imaging lens assembly 10 is shown in Table 3.

TABLE 3

| f | 1.30 |
|---|---|
| HFOV | 60.0 |
| Fno | 2.46 |
| f/f2 | 1.26 |
| |f/f1| | 0.62 |
| (R5 + R6)/(R5 − R6) | 0.50 |
| TTL/ImgH | 1.98 |
| |f3/f4| | 1.65 |

Figure 2A:
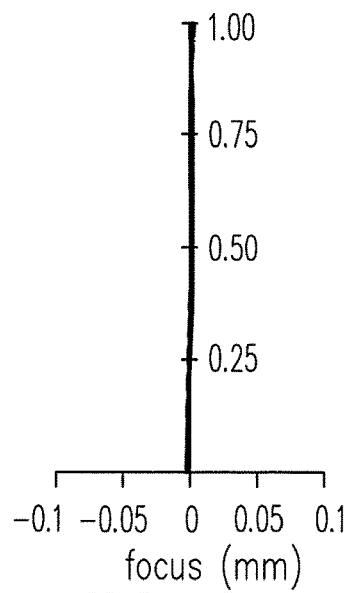
FIG. 2A to FIG. 2C are diagrams of a longitudinal spherical aberration, of an astigmatism aberration, and of a distortion aberration according to the first embodiment of the invention, respectively.
Figure 2B:
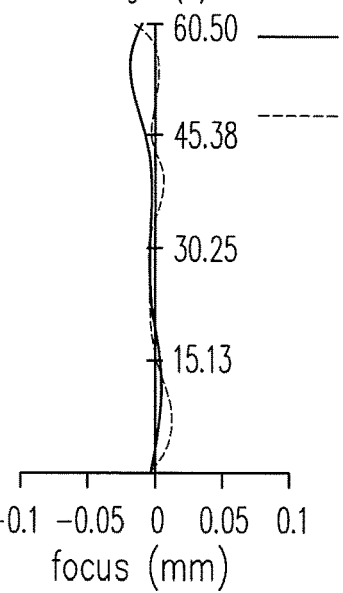
Figure 2C:
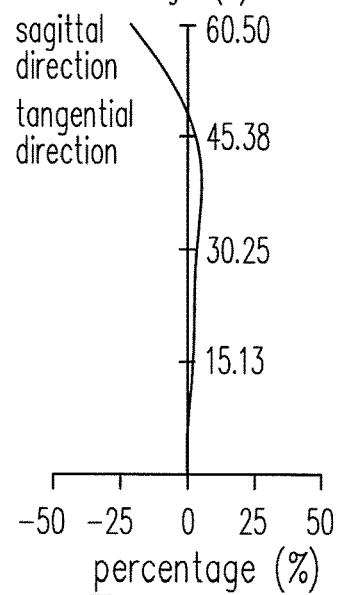

FIG. 2A to FIG. 2C are diagrams of a longitudinal spherical aberration, of an astigmatism aberration, and of a distortion aberration according to the first embodiment of the invention, respectively. In FIG. 2A, curves showing respective wavelengths are close to each other and approach the middle, which indicates that the off-axis lights of different heights are concentrated near an imaging point. It can be learned from the extent of inclination of the curves showing respective wavelengths that the deviation of imaging points of the off-axis lights of different heights is controlled within a range of ±0.02 mm, and hence the issue of the longitudinal spherical aberration is resolved to a great extent. Additionally, the 5 representative wavelengths are quite close to each other, which means that imaging positions of lights having different wavelengths have been really concentrated, and the chromatic aberration is thus significantly corrected as well. FIG. 2B illustrates an astigmatism aberration regarding a sagittal direction on the image plane 100 and an astigmatism aberration regarding a tangential direction on the image plane 100 according to the first embodiment of the invention. In FIG. 2B, the variation in a focal length of a light having a wavelength of 555 nm in the whole field of view falls within ±0.03 mm, which indicates that the wide angle imaging lens assembly 10 provided in the first embodiment of the invention can effectively eliminate the aberration. FIG. 2C illustrates a distortion aberration on the image plane 100 according to the first embodiment of the invention. In FIG. 2C, the distortion aberration of the light having a wavelength of 555 nm remains within a range of ±25%, which indicates that the distortion aberration provided in the first embodiment of the invention complies with the requirement of imaging quality for the optical system.

Based on the above, as compared to the existing optical lens, the wide angle imaging lens assembly 10 provided in the first embodiment of the invention can have the reduced system volume and length while retaining favorable optical performance and providing satisfactory imaging quality.

Figure 3:
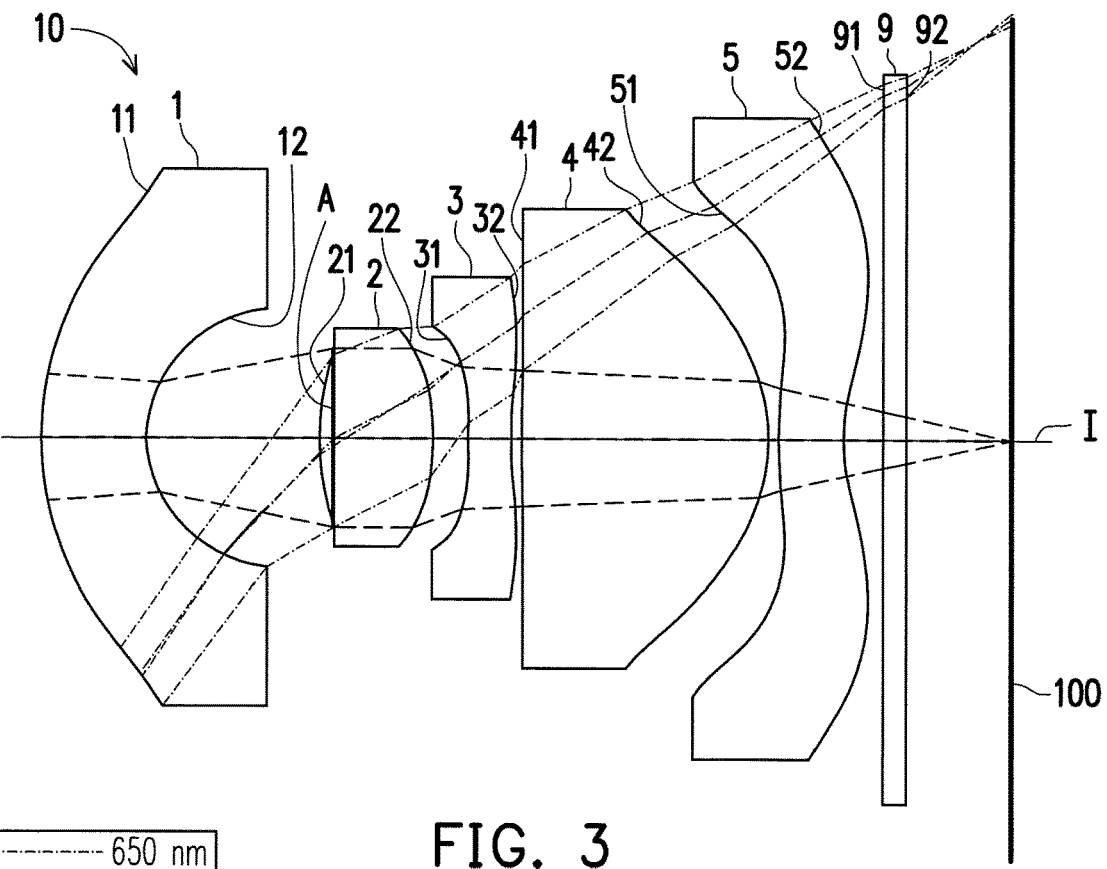
FIG. 3 is a schematic view of a wide angle imaging lens assembly according to a second embodiment of the invention.

FIG. 3 is a schematic view of a wide angle imaging lens assembly according to a second embodiment of the invention. As shown in FIG. 3, the wide angle imaging lens assembly 10 provided in the second embodiment of the invention is roughly the same as the wide angle imaging lens assembly 10 provided in the first embodiment of the invention, and the differences therebetween more or less lie in the optical data, the aspheric coefficient, and parameters between the lens elements (the first lens element 1, the second lens element 2, the third lens element 3, the fourth lens element 4, and the fifth lens element 5). Besides, the object-side surface 41 of the fourth lens element 4 is convex.

The detailed optical data of the wide angle imaging lens assembly 10 provided in the second embodiment of the invention are shown in Table 4. Each aspheric coefficient of the 10 surfaces from the object-side surface 11 of the first lens element 1 to the image-side surface 52 of the fifth lens element 5 in Formula (1) is shown in Table 5. In the second embodiment, the relation among the important parameters of the wide angle imaging lens assembly 10 is shown in Table 6.

TABLE 4

Second embodiment

| surface | | radius of curvature (mm) | distance (mm) | index of refraction | coefficient of dispersion | focal length (mm) |
|---|---|---|---|---|---|---|
| object | | infinity | infinity | | | |
| first lens element 1 | object-side surface 11 | 1.234 | 0.490 | 1.545 | 55.9 | −1.81 |
| | image-side surface 12 | 0.472 | 0.868 | | | |
| aperture A | | infinity | −0.057 | | | |
| second lens element 2 | object-side surface 21 | 1.093 | 0.533 | 1.545 | 55.9 | 1.05 |
| | image-side surface 22 | −0.991 | 0.164 | | | |
| third lens element 3 | object-side surface 31 | −7.894 | 0.200 | 1.643 | 22.4 | −1.86 |
| | image-side surface 32 | 1.434 | 0.050 | | | |
| fourth lens element 4 | object-side surface 41 | 17.861 | 1.152 | 1.545 | 55.9 | 1.31 |
| | image-side surface 42 | −0.729 | 0.050 | | | |
| fifth lens element 5 | object-side surface 51 | 1.391 | 0.300 | 1.643 | 22.4 | −2.84 |
| | image-side surface 52 | 0.725 | 0.185 | | | |
| optical filter 9 | object-side surface 91 | infinity | 0.110 | 1.516 | 64.1 | |
| | image-side surface 92 | infinity | 0.493 | | | |
| | image plane 100 | infinity | | | | |

TABLE 5

| surface | K | $A_4$ | $A_6$ | $A_8$ |
|---|---|---|---|---|
| 11 | −6.690E+00 | 4.699E−01 | −7.100E−01 | 9.693E−01 |
| 12 | −2.983E−01 | 7.031E−02 | 2.129E+00 | −2.542E+01 |
| 21 | −6.512E+00 | 6.544E−01 | 3.505E−01 | −3.244E+01 |
| 22 | 2.518E+00 | −2.867E−01 | 2.263E+00 | −3.708E+00 |
| 31 | 3.045E+01 | −2.717E+00 | 2.344E+00 | −9.012E−01 |
| 32 | −3.566E+00 | −1.303E+00 | 1.358E+00 | 1.906E+00 |
| 41 | −8.996E+01 | 4.959E−01 | −4.119E+00 | 1.113E+01 |
| 42 | −8.204E−01 | −2.716E−01 | 2.080E+00 | −5.919E+00 |
| 51 | −2.189E+01 | −6.209E−01 | −1.749E−01 | 1.694E+00 |
| 52 | −1.315E+00 | −1.478E+00 | 1.952E+00 | −1.667E+00 |

TABLE 5-continued

| surface | $A_{10}$ | $A_{12}$ | $A_{14}$ |
|---|---|---|---|
| 11 | −7.981E−01 | 3.085E−01 | −4.375E−02 |
| 12 | 1.371E+02 | −3.121E+02 | 2.242E+02 |
| 21 | 2.703E+02 | −1.124E+03 | 1.172E+03 |
| 22 | −3.237E+00 | 1.541E+01 | 5.493E+00 |
| 31 | −5.159E+01 | 5.455E+01 | −2.598E+02 |
| 32 | −1.047E+01 | 2.153E+01 | −1.624E+01 |
| 41 | −1.349E+01 | 7.628E+00 | −1.644E+00 |
| 42 | 8.708E+00 | −6.789E+00 | 2.272E+00 |
| 51 | −3.118E+00 | 2.391E+00 | −6.337E−01 |
| 52 | 8.580E−01 | −2.443E−01 | 3.027E−02 |

TABLE 6

| f | 1.31 |
|---|---|
| HFOV | 60.0 |
| Fno | 2.42 |
| f/f2 | 1.25 |
| |f/f1| | 0.72 |

TABLE 6-continued

| (R5 + R6)/(R5 − R6) | 0.69 |
|---|---|
| TTL/ImgH | 2.50 |
| |f3/f4| | 1.42 |

Figure 4A:
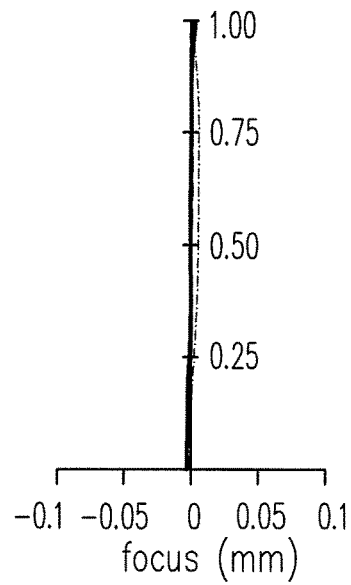
FIG. 4A to FIG. 4C are diagrams of a longitudinal spherical aberration, of an astigmatism aberration, and of a distortion aberration according to the second embodiment of the invention, respectively.
Figure 4B:
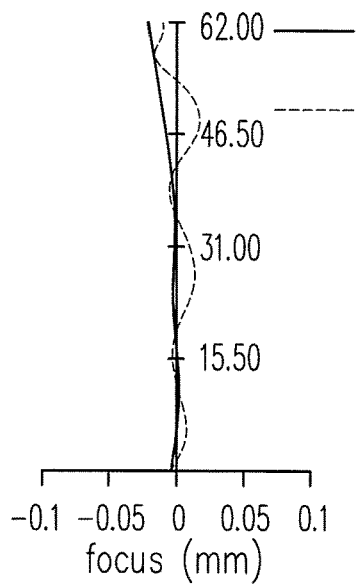
Figure 4C:
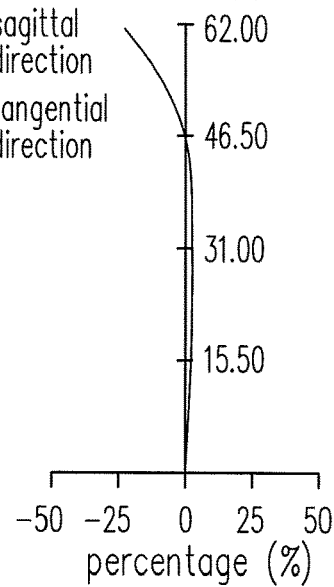

FIG. 4A to FIG. 4C are diagrams of a longitudinal spherical aberration, of an astigmatism aberration, and of a distortion aberration according to the second embodiment of the invention, respectively. In FIG. 4A, the deviation of imaging point of the off-axis lights of different heights is controlled within a range of ±0.02 mm. In FIG. 4B, the variation in a focal length of a light having a wavelength of 555 nm in a whole field of view falls within ±0.03 mm. In FIG. 4C, the distortion aberration of the light having the wavelength of 555 nm remains within a range of ±26%. Based on the above, as compared to the existing optical lens, the wide imaging lens assembly 10 provided in the second embodiment of the invention can still have the reduced system volume and length while retaining favorable optical performance and providing satisfactory imaging quality.

Figure 5:
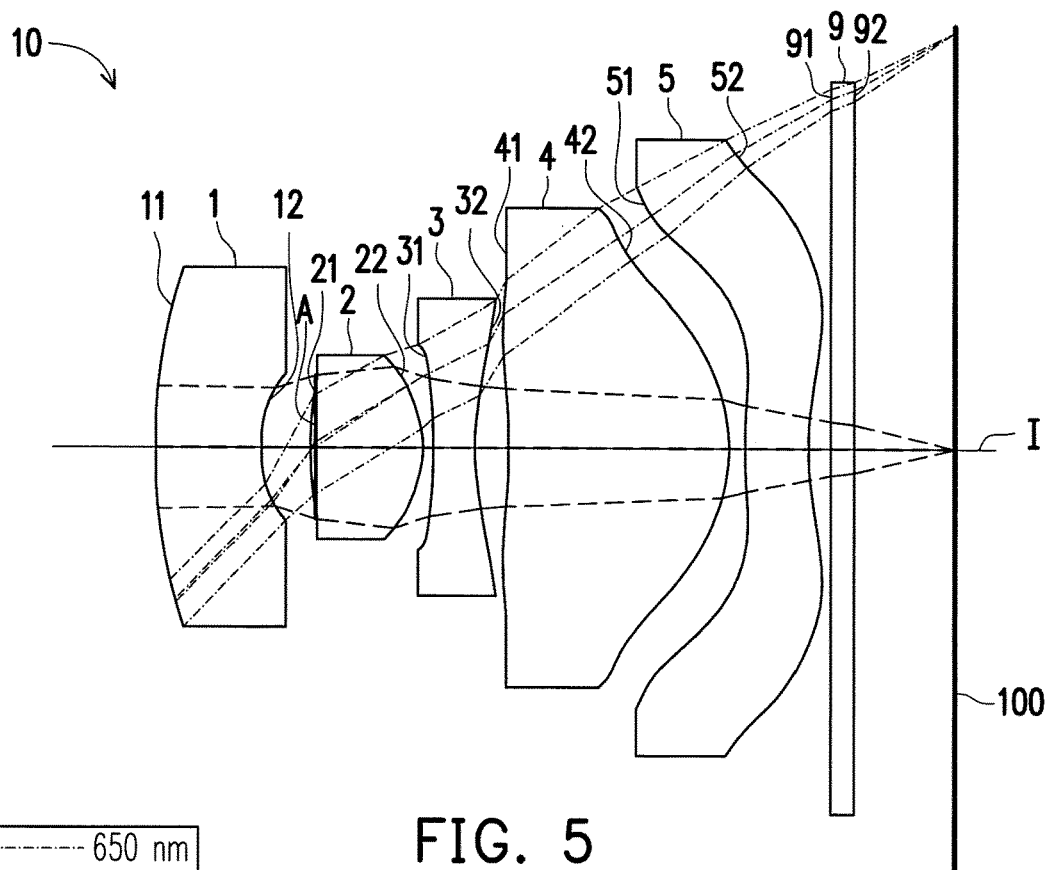
FIG. 5 is a schematic view of a wide angle imaging lens assembly according to a third embodiment of the invention.

FIG. 5 is a schematic view of a wide angle imaging lens assembly according to a third embodiment of the invention. As illustrated in FIG. 5, the wide angle imaging lens assembly 10 provided in the third embodiment of the invention is roughly the same as the wide angle imaging lens assembly 10 provided in the first embodiment of the invention, and the differences therebetween more or less lie in the optical data, the aspheric coefficient, and parameters between the lens elements (the first lens element 1, the second lens element 2, the third lens element 3, the fourth lens element 4, and the fifth lens element 5).

The detailed optical data of the wide angle imaging lens assembly 10 provided in the third embodiment of the invention is shown in Table 7. Each aspheric coefficient of the 10 surfaces from the object-side surface 11 of the first lens element 1 to the image-side surface 52 of the fifth lens element 5 in Formula (1) is shown in Table 8. In the third embodiment, the relation among the important parameters of the wide angle imaging lens assembly 10 is shown in Table 9.

TABLE 7

Third embodiment

| surface | | radius of curvature (mm) | distance (mm) | index of refraction | coefficient of dispersion | focal length (mm) |
|---|---|---|---|---|---|---|
| object | | infinity | infinity | | | |
| first lens element 1 | object-side surface 11 | 4.334 | 0.500 | 1.545 | 55.9 | −1.41 |
| | image-side surface 12 | 0.627 | 0.262 | | | |
| aperture A | | infinity | −0.030 | | | |
| second lens element 2 | object-side surface 21 | 1.300 | 0.543 | 1.545 | 55.9 | 0.62 |
| | image-side surface 22 | −0.393 | 0.050 | | | |
| third lens element 3 | object-side surface 31 | −1.832 | 0.200 | 1.643 | 22.4 | −1.02 |
| | image-side surface 32 | 1.071 | 0.159 | | | |
| fourth lens element 4 | object-side surface 41 | −3.093 | 1.056 | 1.545 | 55.9 | 1.67 |
| | image-side surface 42 | −0.789 | 0.077 | | | |
| fifth lens element 5 | object-side surface 51 | 1.683 | 0.300 | 1.643 | 22.4 | −6.42 |
| | image-side surface 52 | 1.114 | 0.104 | | | |
| optical filter 9 | object-side surface 91 | infinity | 0.110 | 1.516 | 64.1 | |
| | image-side surface 92 | infinity | 0.490 | | | |
| | image plane 100 | infinity | | | | |

TABLE 8

| surface | K | $A_4$ | $A_6$ | $A_8$ |
|---|---|---|---|---|
| 11 | −9.900E+01 | 6.450E−01 | −1.562E+00 | 3.797E+00 |
| 12 | 1.969E+00 | 8.867E−01 | 1.166E+00 | −2.597E+00 |
| 21 | −1.349E+01 | 1.015E+00 | 2.941E−02 | −8.612E+01 |
| 22 | −7.036E−01 | 6.560E+00 | −8.737E+01 | 8.479E+02 |
| 31 | 9.671E+00 | 4.638E+00 | −7.523E+01 | 7.312E+02 |
| 32 | −1.949E+00 | −1.353E+00 | 7.889E+00 | −3.590E+01 |
| 41 | −5.214E+00 | −1.937E−01 | 2.644E+00 | −2.102E+00 |
| 42 | −6.831E−01 | −1.252E+00 | 6.582E+00 | −1.625E+01 |
| 51 | −1.975E+01 | −1.936E+00 | 5.692E+00 | −1.294E+01 |
| 52 | −1.573E+00 | −1.022E+00 | 1.100E+00 | −9.734E−01 |

| surface | $A_{10}$ | $A_{12}$ | $A_{14}$ |
|---|---|---|---|
| 11 | −7.171E+00 | 7.275E+00 | −2.983E+00 |
| 12 | −1.598E+03 | 2.209E+04 | −1.069E+05 |
| 21 | 9.305E+02 | −5.248E+03 | 8.229E+03 |
| 22 | −5.451E+03 | 1.996E+04 | −3.164E+04 |
| 31 | −4.660E+03 | 1.663E+04 | −2.569E+04 |
| 32 | 9.817E+01 | −1.449E+02 | 8.787E+01 |
| 41 | −1.305E+01 | 3.218E+01 | −2.291E+01 |
| 42 | 2.134E+01 | −1.343E+01 | 3.166E+00 |
| 51 | 1.524E+01 | −8.390E+00 | 1.744E+00 |
| 52 | 5.795E−01 | −2.044E−01 | 3.326E−02 |

TABLE 9

| f | 1.31 |
|---|---|
| HFOV | 60.0 |
| Fno | 2.48 |
| f/f2 | 2.10 |
| \|f/f1\| | 0.93 |
| (R5 + R6)/(R5 − R6) | 0.26 |
| TTL/ImgH | 2.11 |
| \|f3/f4\| | 0.61 |

Figure 6A:
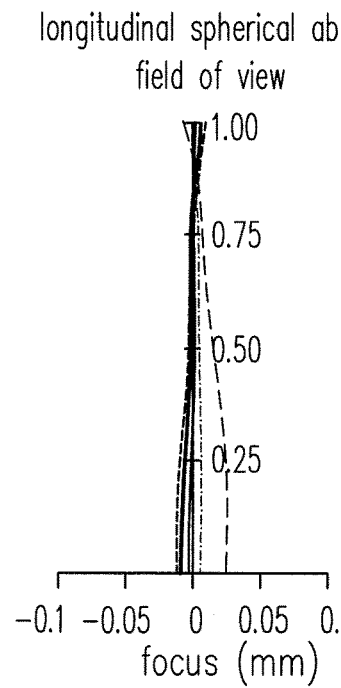
FIG. 6A to FIG. 6C are diagrams of a longitudinal spherical aberration, of an astigmatism aberration, and of a distortion aberration according to the third embodiment of the invention, respectively.
Figure 6B:
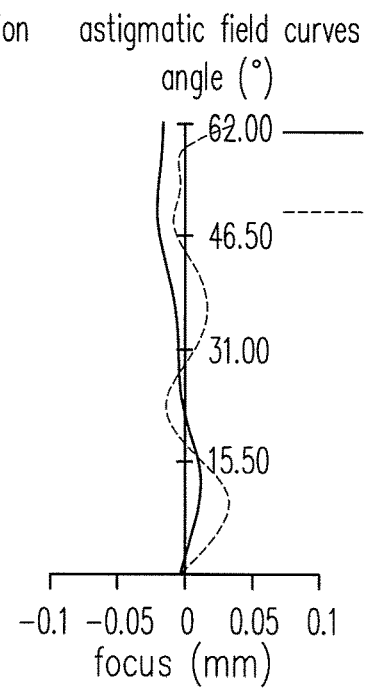
Figure 6C:
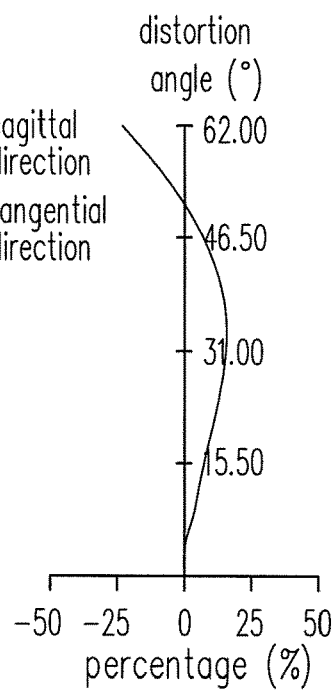

FIG. 6A to FIG. 6C are diagrams of a longitudinal spherical aberration, of an astigmatism aberration, and of a distortion aberration according to the third embodiment of the invention, respectively. In FIG. 6A, the deviation of imaging points of off-axis lights of different heights is controlled within a range of ±0.03 mm. In FIG. 6B, the variation in a focal length of a light having a wavelength of 555 inn in a whole field of view falls within +0.04 mm. In FIG. 4C, the distortion aberration of the light having the wavelength of 555 nm remains within a range of ±25%. Based on the above, as compared to the existing optical lens, the wide imaging lens assembly provided in the third embodiment of the invention can still have the reduced system volume and length while retaining favorable optical performance and providing satisfactory imaging quality.

FIG. 7 is a schematic view of a wide angle imaging lens assembly according to a fourth embodiment of the invention. As shown in FIG. 7, the wide angle imaging lens assembly 10 provided in the fourth embodiment of the invention is roughly the same as the wide angle imaging lens assembly 10 provided in the first embodiment of the invention, and the differences therebetween more or less lie in the optical data, the aspheric coefficient, and parameters between the lens elements (the first lens element 1, the second lens element 2, the third lens element 3, the fourth lens element 4, and the fifth lens element 5).

The detailed optical data of the wide angle imaging lens assembly 10 provided in the fourth embodiment of the invention are shown in Table 10. Each aspheric coefficient of the 10 surfaces from the object-side surface 11 of the first lens element 1 to the image-side surface 52 of the fifth lens element 5 in Formula (1) is shown in Table 11. In the fourth embodiment, the relation among the important parameters of the wide angle imaging lens assembly 10 is shown in Table 12.

TABLE 11

| surface | K | $A_4$ | $A_6$ | $A_8$ |
|---|---|---|---|---|
| 11 | −9.900E+01 | 4.486E−01 | −7.936E−01 | 1.504E+00 |
| 12 | 1.820E+00 | 7.760E−01 | 1.071E+00 | −2.060E+01 |
| 21 | −1.349E+01 | 1.030E+00 | 1.461E+00 | −7.707E+01 |
| 22 | −5.539E−01 | 3.310E+00 | −3.703E+01 | 3.243E+02 |
| 31 | 5.452E+00 | 1.702E+00 | −2.886E+01 | 2.444E+02 |
| 32 | −2.059E+00 | −9.822E−01 | 4.582E+00 | −1.833E+01 |
| 41 | −5.214E+00 | 7.053E−02 | −8.531E−01 | 6.049E+00 |
| 42 | −6.619E−01 | −1.535E+00 | 1.812E+00 | −5.536E+00 |
| 51 | −1.975E+01 | −4.139E−01 | −1.762E+00 | 5.137E+00 |
| 52 | −1.610E+00 | −1.455E+00 | 1.959E+00 | −1.630E+00 |

| surface | $A_{10}$ | $A_{12}$ | $A_{14}$ |
|---|---|---|---|
| 11 | −2.226E+00 | 1.752E+00 | −5.668E−01 |
| 12 | −2.019E+01 | 1.425E+03 | −7.551E+03 |
| 21 | 1.114E+03 | −7.770E+03 | 2.128E+04 |
| 22 | −1.955E+03 | 6.881E+03 | −1.053E+04 |
| 31 | −1.422E+03 | 4.640E+03 | −6.616E+03 |
| 32 | 4.584E+01 | −6.245E+01 | 3.486E+01 |
| 41 | −1.487E+01 | 1.643E+01 | −7.128E+00 |
| 42 | 9.395E+00 | −7.411E+00 | 2.167E+00 |
| 51 | −6.155E+00 | 3.489E+00 | −7.480E−01 |
| 52 | 8.298E−01 | −2.449E−01 | 3.220E−02 |

TABLE 12

| | |
|---|---|
| f | 1.31 |
| HFOV | 60.0 |
| Fno | 2.48 |
| f/f2 | 1.70 |
| \|f/f1\| | 0.86 |
| (R5 + R6)/(R5 − R6) | 0.63 |

TABLE 10

Fourth embodiment

| | surface | radius of curvature (mm) | distance (mm) | index of refraction | coefficient of dispersion | focal length (mm) |
|---|---|---|---|---|---|---|
| object | | infinity | infinity | | | |
| first lens element 1 | object-side surface 11 | 6.899 | 0.500 | 1.545 | 55.9 | −1.51 |
| | image-side surface 12 | 0.720 | 0.350 | | | |
| aperture A | | infinity | −0.036 | | | |
| second lens element 2 | object-side surface 21 | 1.260 | 0.534 | 1.545 | 55.9 | 0.77 |
| | image-side surface 22 | −0.538 | 0.050 | | | |
| third lens element 3 | object-side surface 31 | −4.944 | 0.200 | 1.643 | 22.4 | −1.38 |
| | image-side surface 32 | 1.112 | 0.225 | | | |
| fourth lens element 4 | object-side surface 41 | −5.866 | 0.816 | 1.545 | 55.9 | 1.39 |
| | image-side surface 42 | −0.705 | 0.050 | | | |
| fifth lens element 5 | object-side surface 51 | 1.207 | 0.300 | 1.643 | 22.4 | −2.63 |
| | image-side surface 52 | 0.638 | 0.189 | | | |
| optical filter 9 | object-side surface 91 | infinity | 0.110 | 1.516 | 64.1 | |
| | image-side surface 92 | infinity | 0.490 | | | |
| | mage plane 100 | infinity | | | | |

TABLE 12-continued

| TTL/ImgH | 2.08 |
|---|---|
| \|f3/f4\| | 1.00 |

FIG. 8A to FIG. 8C are diagrams of a longitudinal spherical aberration, of an astigmatism aberration, and of a distortion aberration according to the fourth embodiment of the invention, respectively. In FIG. 8A, the deviation of imaging points of off-axis lights of different heights is controlled within a range of ±0.03 mm. In FIG. 8B, the variation in a focal length of a light having a wavelength of 555 nm in a whole field of view falls within ±0.03 mm. In FIG. 8C, a distortion aberration of the light having the wavelength of 555 nm remains within a range of ±26%. Based on the above, as compared to the existing optical lens, the wide imaging lens assembly 10 provided in the fourth embodiment of the invention can still have the reduced system volume and length while retaining favorable optical performance and providing satisfactory imaging quality.

To sum up, the wide angle imaging lens assembly provided in the embodiment of the invention can have advantages and achieve effects as follows. The first lens element is adapted to provide the function of collecting light, and the negative refractive power of the first lens element can collect the large-angle imaging light into the aperture. The second lens element is adapted to focus the imaging light passing through the aperture and form an image, and the second lens element along with the third lens element and the fourth lens element is adapted to correct the chromatic aberration. The inflection points of the fifth lens element are designed to reduce the system length and to correct the angle of incidence at which the imaging light enters the image plane. If $1.25 \leq f/f2 \leq 2.1$ is satisfied, the chromatic aberration can be corrected. If $(R5+R6)/(R5-R6)>0.25$ is satisfied, the shape of the third lens element can be controlled, such that the third lens element is bent toward the image side. If $0.6 \leq |f/f1| \leq 1.0$ is satisfied, the light collecting angle can be controlled while the system length is being controlled. As compared to the existing wide angle imaging lens assembly (with the field of view approximately falling within a range from 70 degrees to 80 degrees), the wide angle imaging lens assembly provided in the embodiment of the invention can have a larger light collecting angle. If $1.6 \leq TTL/ImgH \leq 2.5$ is satisfied, the manufacturing yield and the system length and volume can be balanced. If at least one of $0.6 \leq |f3/f4| \leq 2.0$ and $|V1-V2|<10$ is satisfied, the chromatic aberration can be corrected effectively.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A wide angle imaging lens assembly, comprising a first lens element, an aperture, a second lens element, a third lens element, a fourth lens element, and a fifth lens element arranged in order from an object side to an image side along an optical axis, wherein each of the first, second, third, fourth, and fifth lens elements comprises an object-side surface facing the object side and allowing an imaging light to pass through and an image-side surface facing the image side and allowing the imaging light to pass through, and the wide angle imaging lens assembly satisfies:

$0.6 \leq |f/f1| \leq 1.0;$ $1.25 \leq f/f2 \leq 2.1;$ $0.6 \leq |f3/f4| \leq 1.65;$ $(R5+R6)/(R5-R6)>0.25;$ and $1.2 \leq \tan(HFOV) \leq 2.15,$ wherein f is an effective focal length of the wide angle imaging lens assembly, f1 is a focal length of the first lens element, f2 is a focal length of the second lens element, f3 is a focal length of the third lens element, f4 is a focal length of the fourth lens element, R5 is a radius of curvature of the object-side surface of the third lens element, R6 is a radius of curvature of the image-side surface of the third lens element, and HFOV is a half field of view of the wide angle imaging lens assembly, wherein the object-side surface of the first lens element in an optical axis region is convex, and wherein the first lens element has a negative refractive power, the second lens element has a positive refractive power, the third lens element has a negative refractive power, the fourth lens element has a positive refractive power, and the fifth lens element has a negative refractive power.

2. The wide angle imaging lens assembly according to claim 1, wherein the image-side surface of the first lens element is concave, the object-side surface of the second lens element is convex, the image-side surface of the second lens element is convex, the image-side surface of the third lens element is concave, the image-side surface of the fourth lens element is convex, the object-side surface of the fifth lens element is convex, the image-side surface of the fifth lens element is concave, and the object-side surface and image-side surface of the fifth lens element both have an inflection point.

3. The wide angle imaging lens assembly according to claim 1, further satisfying:

$1.6 \leq TTL/ImgH \leq 2.5,$ wherein TTL is a distance on the optical axis from the first lens element to an imaging plane, and ImgH is an imaging height.

4. The wide angle imaging lens assembly according to claim 1, further satisfying:

$|V1-V2|<10,$ wherein V1 is a coefficient of dispersion of the first lens element, and V2 is a coefficient of dispersion of the second lens element.

5. A wide angle imaging lens assembly, comprising a first lens element, an aperture, a second lens element, a third lens element, a fourth lens element, and a fifth lens element arranged in order from an object side to an image side along an optical axis, wherein each of the first, second, third, fourth, and fifth lens elements comprises an object-side surface facing the object side and allowing an imaging light to pass through and an image-side surface facing the image side and allowing the imaging light to pass through, and the wide angle imaging lens assembly satisfies:

$0.6 \leq |f/f1| \leq 1.0;$ $1.25 \leq f/f2 \leq 2.1;$ $0.6 \leq |f3/f4| \leq 1.65;$ $(R5+R6)/(R5-R6)>0.25$; and $1.2 \leq \tan(\text{HFOV}) \leq 2.15$, wherein f is an effective focal length of the wide angle imaging lens assembly, f1 is a focal length of the first lens element, f2 is a focal length of the second lens element, f3 is a focal length of the third lens element, f4 is a focal length of the fourth lens element, R5 is a radius of curvature of the object-side surface of the third lens element, R6 is a radius of curvature of the image-side surface of the third lens element, and HFOV is a half field of view of the wide angle imaging lens assembly, wherein the object-side surface of the first lens element in an optical axis region is convex, wherein the image-side surface of the first lens element is concave, the object-side surface of the second lens element is convex, the image-side surface of the second lens element is convex, the image-side surface of the third lens element is concave, the image-side surface of the fourth lens element is convex, the object-side surface of the fifth lens element is convex, the image-side surface of the fifth lens element is concave, and the object-side surface and image-side surface of the fifth lens element both have an inflection point.

* * * * *